(12) United States Patent
D'Hoogh

(10) Patent No.: US 6,385,327 B1
(45) Date of Patent: May 7, 2002

(54) DEVICE HAVING TWO COAXIALLY DISPOSED BODIES WHICH ARE MOVABLE RELATIVE TO ONE ANOTHER ALONG A TRANSLATION AXIS

(75) Inventor: Guido O. M. D'Hoogh, Dendermonde (BE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/273,290

(22) Filed: Mar. 19, 1999

(30) Foreign Application Priority Data

Jun. 16, 1998 (EP) .............................................. 98202005

(51) Int. Cl.[7] .............................................. H04R 25/00
(52) U.S. Cl. ...................... 381/398; 381/413; 381/404; 381/423; 181/166; 181/171
(58) Field of Search ................................. 381/398, 408, 381/413, 423, 404, 403, 420; 181/171, 172, 173, 166

(56) References Cited

U.S. PATENT DOCUMENTS

| | | | | |
|---|---|---|---|---|
| 3,012,107 A | * | 12/1961 | Hanlet | 381/408 |
| 3,573,397 A | * | 4/1971 | Sawyer et al. | 381/423 |
| 4,056,697 A | | 11/1977 | Heil | 179/115.5 |
| 4,228,327 A | * | 10/1980 | Sawafuji | 381/408 |
| 4,538,882 A | | 9/1985 | Tanaka et al. | 350/255 |
| 4,829,582 A | | 5/1989 | Heuvinck | 381/194 |
| 5,003,610 A | * | 3/1991 | Adachi et al. | 381/413 |
| 5,701,358 A | * | 12/1997 | Larsen et al. | 381/423 |
| 5,892,184 A | * | 4/1999 | D'Hoogh | 181/171 |
| 6,069,965 A | * | 5/2000 | Takewa et al. | 381/404 |

* cited by examiner

Primary Examiner—Stella Woo
Assistant Examiner—Suhan Ni

(57) ABSTRACT

A device including two bodies (3, 5) which are disposed coaxially with respect to a translation axis (1), and including a comparatively compact suspension via which at least one of the bodies is movable with respect to the other body along the translation axis. The suspension, which allows comparatively large and accurately defined axial excursions of the one body with respect to the other body, includes a set of at least three blade spring elements (7) which are positioned around the translation axis. These blade spring elements each include two blade springs (7a, 7b) which are inclined with respect to a plane (XY) oriented perpendicularly to the translation axis, the blade springs of each blade spring element each having two peripheral portions (7a1, 7a2; 7b1, 7b2) which each extend parallel to the plane which is oriented perpendicularly to the translation axis. One of the blade springs is connected to the one body near one of its peripheral portions and the other blade spring is connected to the other body near one of its peripheral portions, while the blade springs of each blade spring element are interconnected near their other peripheral portions.

20 Claims, 6 Drawing Sheets

Figure 1:
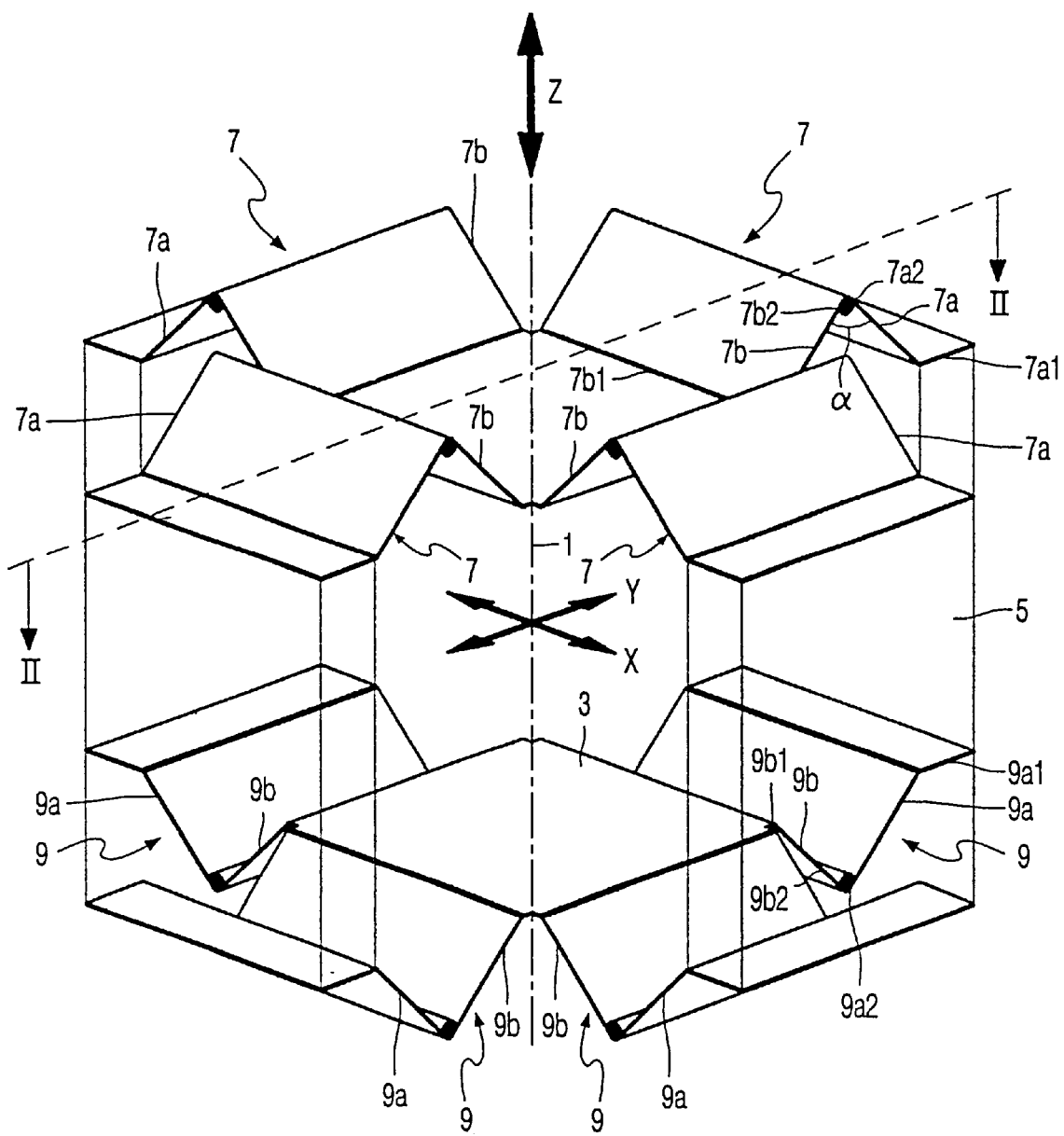

DEVICE HAVING TWO COAXIALLY DISPOSED BODIES WHICH ARE MOVABLE RELATIVE TO ONE ANOTHER ALONG A TRANSLATION AXIS

The invention relates to a device comprising two bodies which are disposed coaxially with respect to a translation axis and comprising a suspension means via which at least one of the bodies is movable with respect to the other body along the translation axis.

Such a device is known from U.S. Pat. No. 4,829,582. Said Patent Specification discloses a loudspeaker having a conical diaphragm connected to a chassis by a suspension means comprising an axially resilient annular centering element. The diaphragm, which has a main axis, has a coil former with a coil secured to it for cooperation with a magnet system via an air gap, the magnet system being secured to the chassis. The centering element, which is made of, for example, a textile fabric, exhibits an undulating pattern viewed in a radial cross-section and extends substantially perpendicularly to the main axis of the diaphragm. The centering element provides a certain axial spring stiffness and such a transverse stiffness that in operation the coil moves centrically in the air gap. A disadvantage of the known loudspeaker is that an extended centering element of comparatively large diameter is necessary in order to allow a comparatively large axial excursion with a satisfactory linearity of the coil to be achieved. In applications where only a limited space is available the known centering element does not allow a comparatively large axial excursion of the element of the diaphragm and hence of the coil to be obtained while the requirements as regards linearity and mechanical stability are fulfilled.

It is an object of the invention to provide a device of the type defined in the opening paragraph, in which the suspension means requires a comparatively small space but allows comparatively large and accurately defined axial excursions of the one body with respect to the other body.

To this end, the device in accordance with the invention is characterized in that the suspension means comprises a set of at least three blade spring elements which are positioned around the translation axis, which blade spring elements each comprise two blade springs which are inclined with respect to a plane oriented perpendicularly to the translation axis, the blade springs of each blade spring element each having two peripheral portions which each extend parallel to the plane which is oriented perpendicularly to the translation axis, one of the blade springs being connected to the one body near one of its peripheral portions and the other blade spring being connected to the other body near one of its peripheral portions, while the blade springs of each blade spring element are interconnected near their other peripheral portions.

As compared with the centering element of the known device the basically frictionless suspension means, in which the blade spring elements are preferably disposed in a triangular or quadrangular arrangement, is of compact dimensions. The shape of the blade spring elements, which is in fact a saddle-roof shape, in combination with the arrangement of the blade spring elements relative to one another, guarantee an accurate linear guidance of the two bodies with respect to one another. The axial spring stiffness of the suspension means used is dictated by the dimensions of the blade spring elements and the flexural stiffness of the blade springs. The blade springs can be made of spring materials which are know per se, such as spring steel, phosphor bronze or suitable plastics, such as a reinforced polycarbonate.

An embodiment of the device in accordance with the invention is characterized in that at their adjacent peripheral portions the blade springs of each blade spring element are interconnected in a non-deformable fashion. In this embodiment, in which the connection between the blade springs of a blade spring element is stiff, the angle formed by each pair of blade springs of each blade spring element is in principle constant, which is favorable in order to preclude material fatigue, particularly at the location of the interconnection.

For similar reasons an embodiment is preferably characterized as defined in Claim 3.

A practical embodiment of the device in accordance with the invention is characterized as defined in Claim 4. A suitable material is for example a plastic, such as polycarbonate, poly-acrylonitrile butadiene styrene, an injection-molding thermosetting material reinforced or non-reinforced with fibers, or mixtures of said plastics. Die-casting or casting metals such as aluminum are also suitable. Preferably, this embodiment is combined with the characteristic features defined in Claim 5. In production this can be implemented by means of an injection-molding machine. During the manufacture of the device the blade springs are then placed into the injection-molding machine and during injection-molding the peripheral portions are embedded in the bodies and the mutually rigid non-deformable connection is established. Preferably, the peripheral portions each have one or more perforations into which the embedding material extends in order to guarantee a connection which is reliable under any conditions.

A further practical embodiment is characterized in that as defined in Claim 7. Preferably, the bent blade spring is embedded near all peripheral portions of said blade springs for reasons already mentioned in the present description.

An alternative embodiment is characterized in that each blade spring element is an integral injection-molded product, preferably of a suitable plastic material, such as a reinforced or non-reinforced polycarbonate. In this embodiment the blade springs are comparatively thin and flexible and the peripheral portions are comparatively thick and non-deformable. If desired, the set of at least three blade spring elements can take the form of an integral injection-molded product.

An embodiment of the device in accordance with the invention is characterized in that the suspension means comprises a further set of at least three blade spring elements positioned around the translation axis, the two sets being axially spaced from one another. It is to be noted, for the sake of completeness, that the further set of a like type is identical to the first-mentioned set of blade spring elements. In such a device an optimum linear guidance of the bodies with respect to one another is achieved. In given applications it is preferred to arrange both sets in a mirror-inverted relationship with respect to a plane perpendicular to the translation axis, in such a manner that the asymmetric and non-linear behavior of one set is compensated for by the corresponding behavior of the other set.

The invention further relates to a loudspeaker device comprising a chassis and a diaphragm arrangement which is movable with respect to the chassis. In order to enable a compact loudspeaker device having a diaphragm arrangement capable of performing a comparatively large excursion the loudspeaker device in accordance with the invention comprises a device in accordance with the invention, the chassis forming or comprising the one body and the diaphragm arrangement forming or comprising the other body. Herein, a loudspeaker device is to be understood to mean both a loudspeaker and a passive radiator. In the case of a loudspeaker the term diaphragm arrangement covers both the diaphragm itself and an associated driving element, generally a driving coil. In operation, as is commonly known, this driving element cooperates with a further driving element, generally a permanent magnet, which is connected to the chassis.

It is to be noted that from U.S. Pat. No. 4,056,697 an arrangement is known for connecting a sound-reproducing movable diaphragm to a chassis or baffle. The arrangement includes two rigid non-deformable elongate planar members, which are connected to one another by means of a hinge, one of the members being connected to the diaphragm by means of a hinge and the other member being connected to the baffle by means of a hinge. The known arrangement has the disadvantage that during use the hinges are subjected to a substantial bending load, which may give rise to premature fatigue in the hinges. A further disadvantage is the limited excursion of the diaphragm with respect to the baffle allowed by the use of the suspension means.

The invention further relates to an actuator having a stationary part, a part which is translatable with respect to the stationary part, and an electromagnetic driving system. In order to enable a compact actuator having a translatable part whose excursion is comparatively large to be obtained, the actuator in accordance with the invention includes a device in accordance with the invention, the stationary part forming or comprising the one body and the translatable part forming or comprising the other body. The actuator in accordance with the invention is suitable, for example, for driving panel-shaped surfaces for the generation of low-frequency sound waves, for example sound waves having a frequencies from 20 Hz. The actuator in accordance with the invention is further suitable for use in vibration suppression systems for the purpose of noise abatement or for the purpose of vibration cancellation in machinery.

The invention also relates to a suspension means constructed and obviously intended for use in a device in accordance with the invention.

With respect to the Claims, it is to be noted that various combinations of characteristic features as defined in the dependent Claims are possible.

Figure 2:
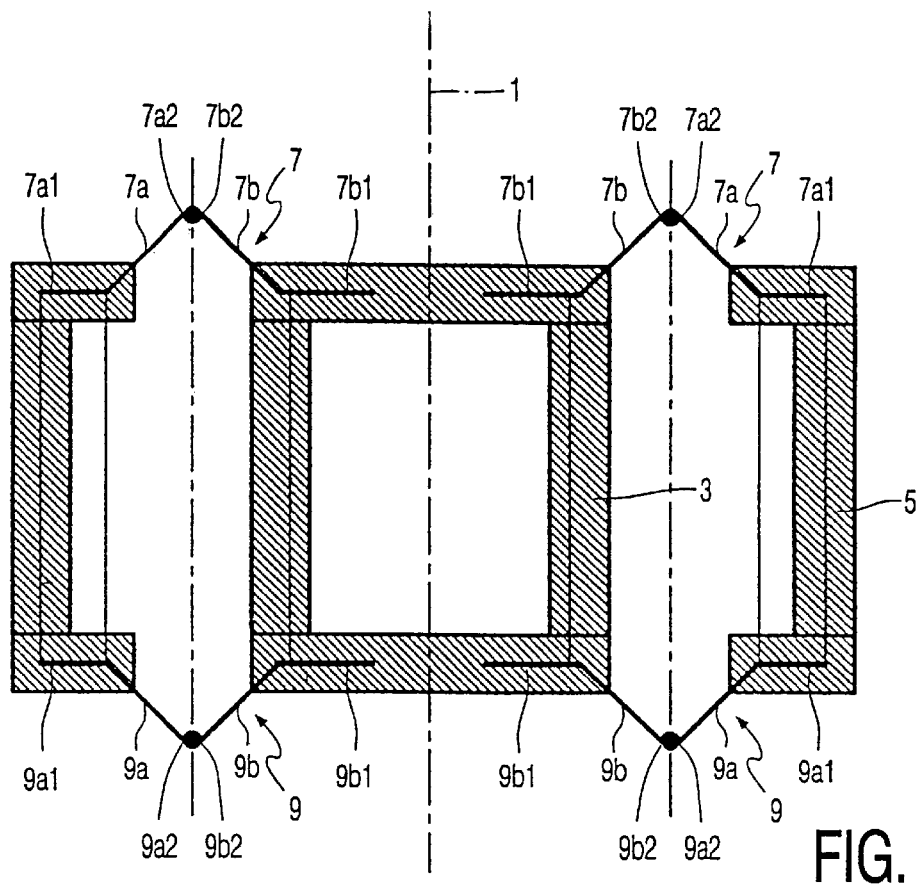
Figure 3:
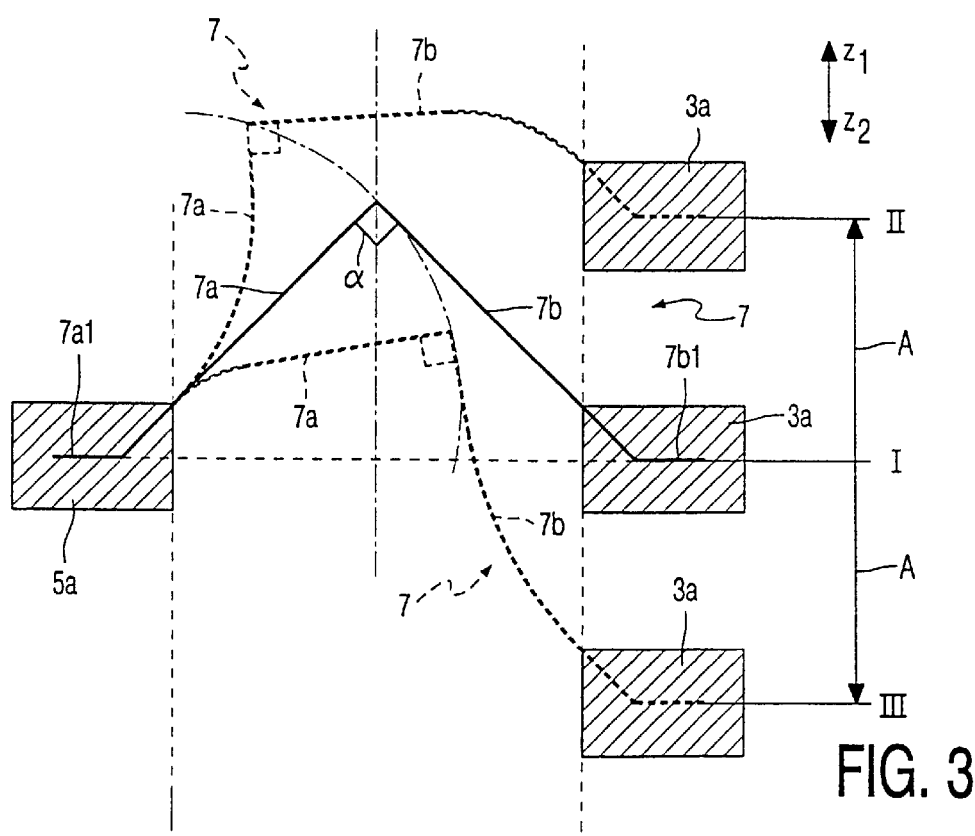
Figure 4:
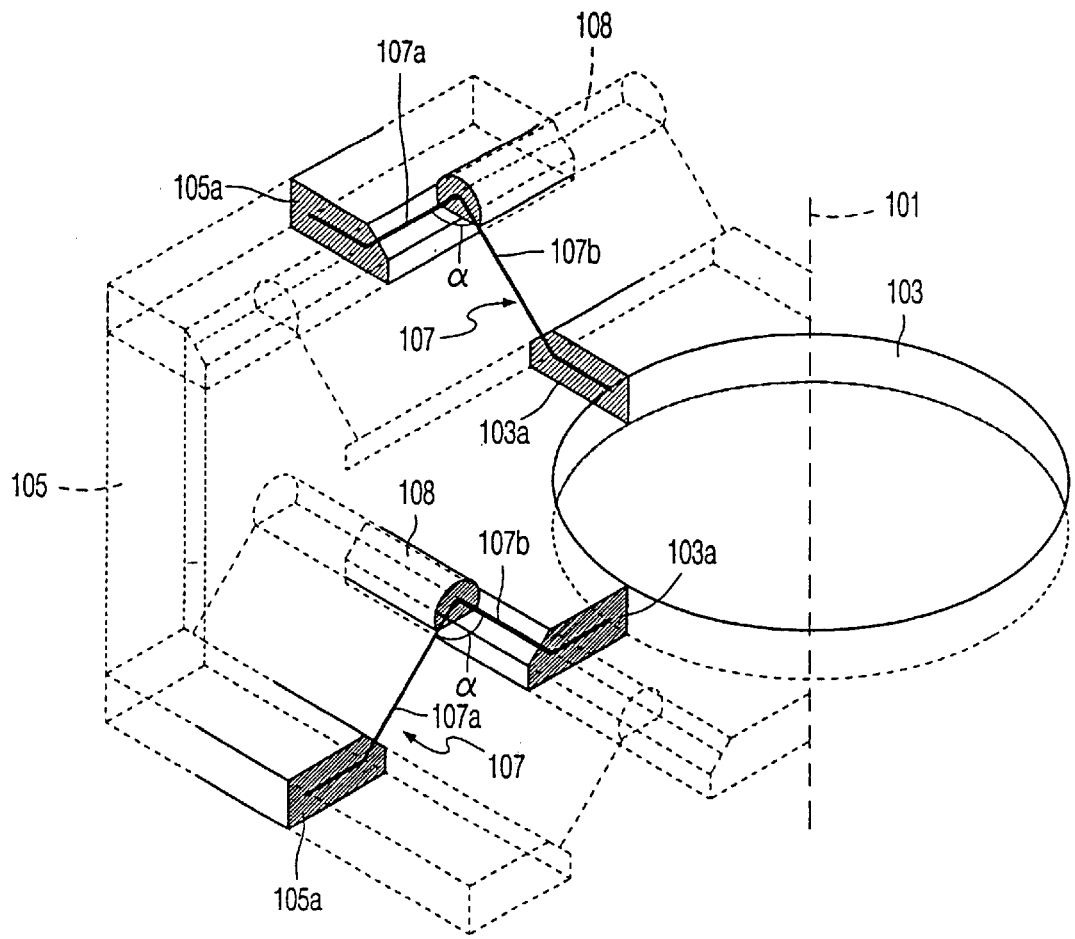
Figure 5:
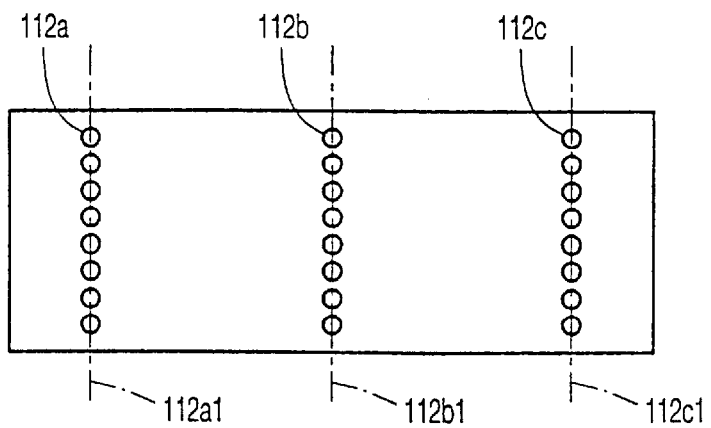
Figure 6A:
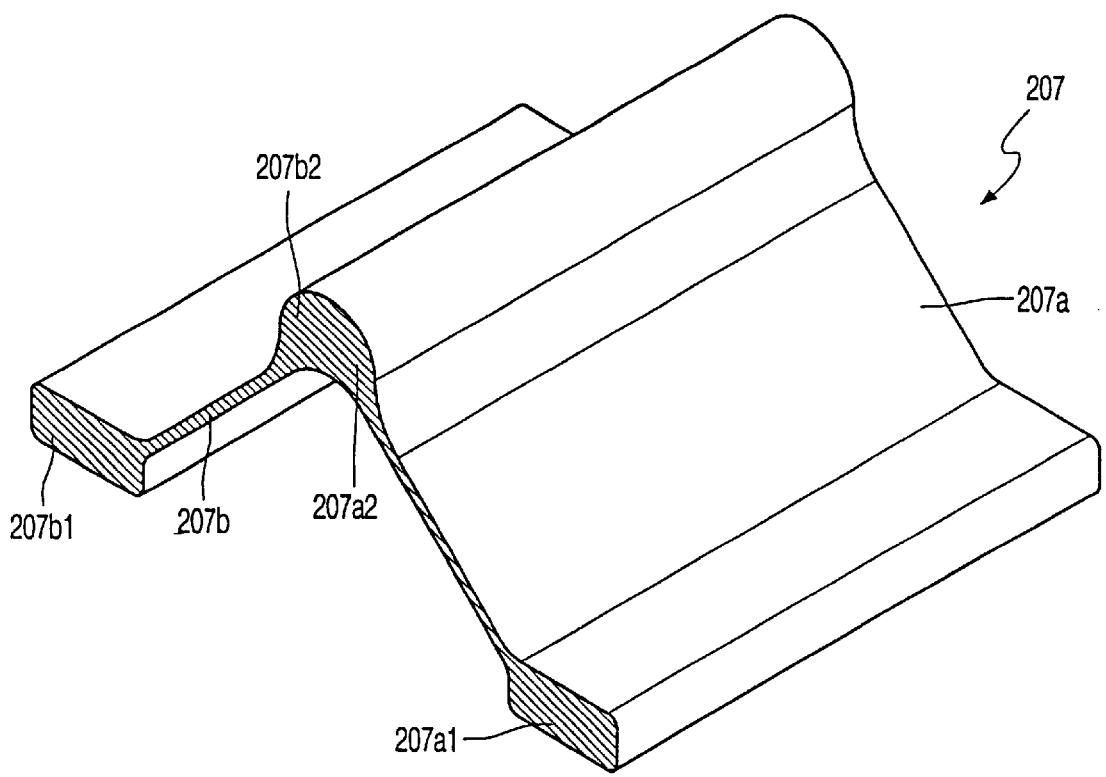
Figure 6B:
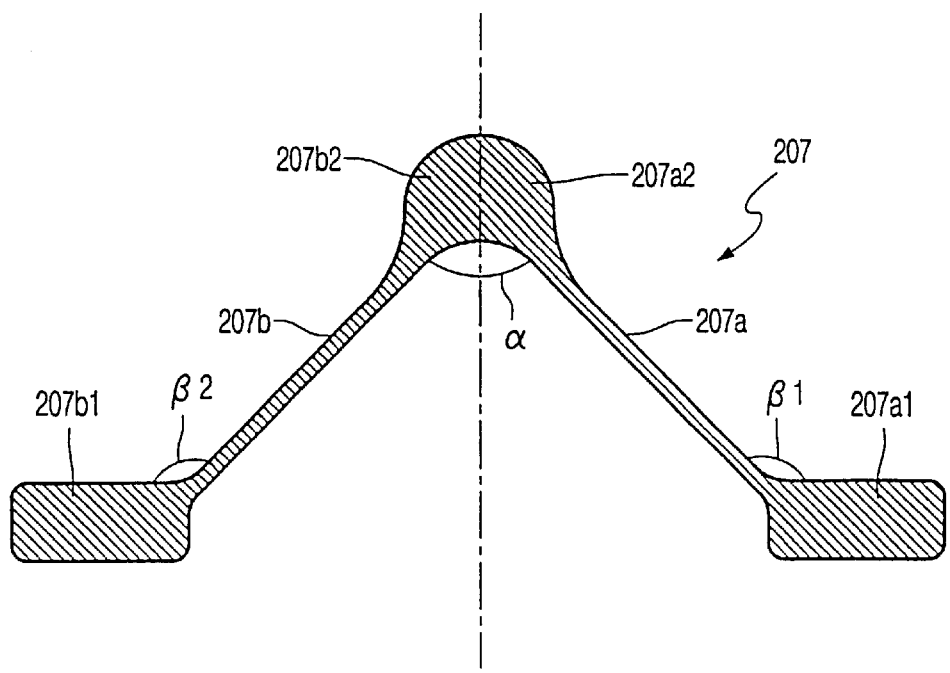
Figure 7:
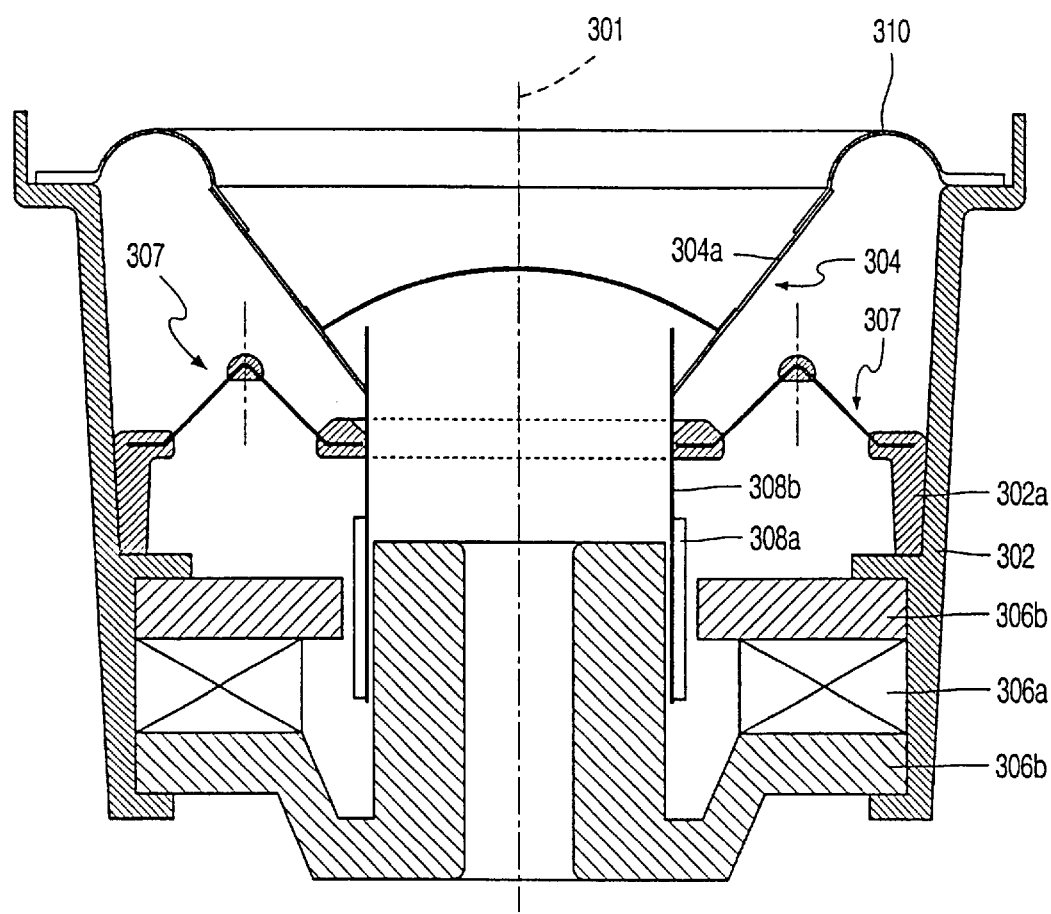
Figure 8:
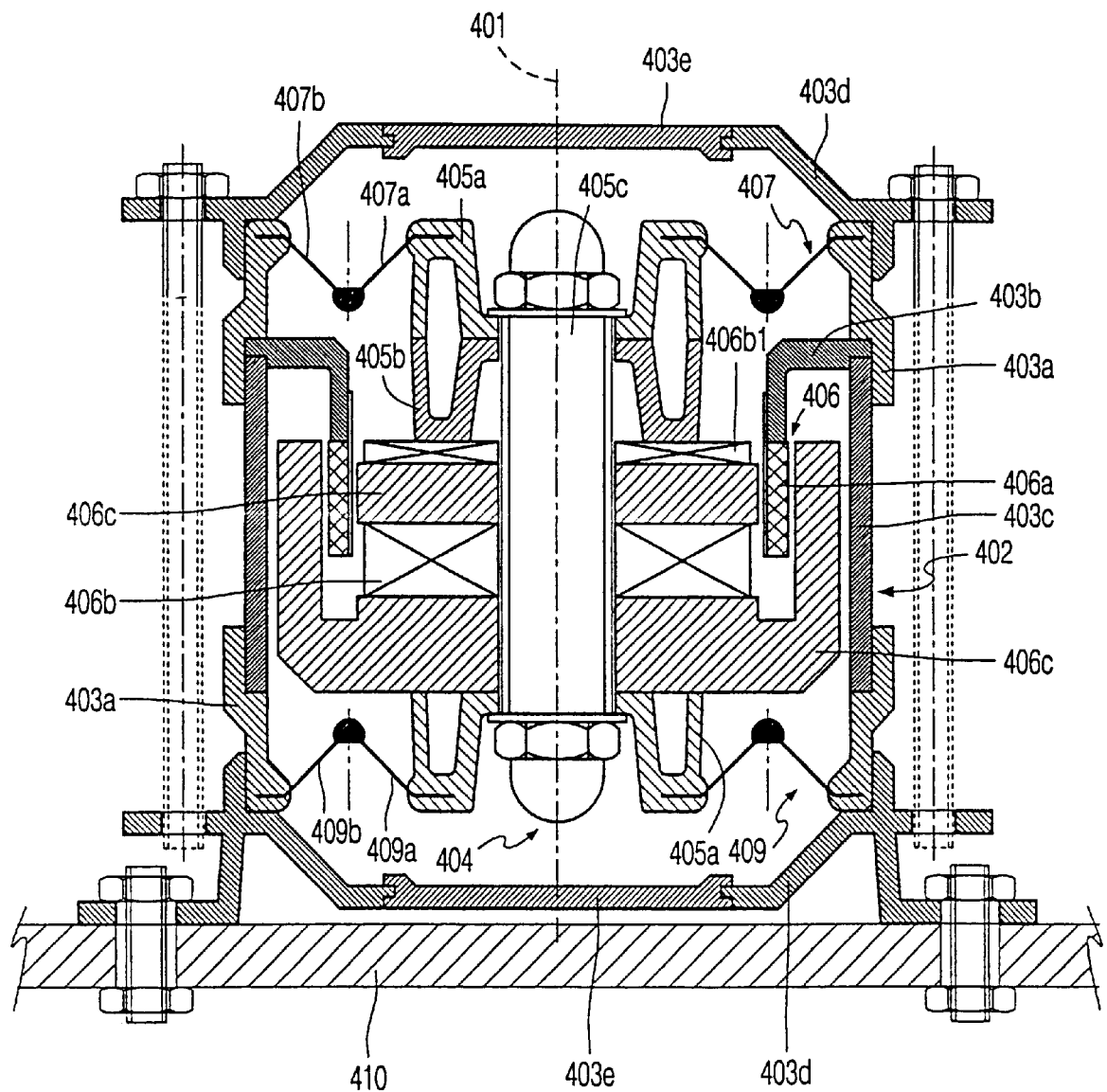

The invention will be described in more detail, by way of example, with reference to the drawings, in which FIG. 1 is a diagrammatic perspective view showing a first embodiment of a device in accordance with the invention, FIG. 2 is a sectional view, not to scale, taken on the line II—II in FIG. 1, FIG. 3 shows diagrammatically a first version of a blade spring element of the device in accordance with the invention in various positions, FIG. 4 is a diagrammatic perspective view showing a part of a second embodiment of a device in accordance with the invention, FIG. 5 shows diagrammatically a version of a blade-spring strip for forming a suitable blade spring element, FIG. 6A is a diagrammatic perspective view showing a second version of a blade spring element, FIG. 6B is a cross-sectional view of the blade spring element shown in FIG. 6A, FIG. 7 is a diagrammatic longitudinal sectional view showing an embodiment of the loudspeaker device in accordance with the invention, and FIG. 8 is a diagrammatic longitudinal sectional view showing an embodiment of the actuator in accordance with the invention.

The device in accordance with the invention shown in FIGS. 1 and 2 comprises two bodies, i.e. a first body 3 and a second body 5, which are disposed coaxially with respect to a main axis or translation axis 1. The first body 3 is movable with respect to the second body 5 along the translation axis 1 in translation directions as indicated by the double arrow Z in the Figure. For this purpose, the device has a suspension means which comprises two sets of four blade spring elements 7 and 9, which are positioned around the translation axis 1. The blade spring elements 7 and 9 each comprise two blade springs 7a, 7b and 9a, 9b, respectively, which are inclined with respect to a plane oriented perpendicularly to the translation axis 1. The plane which is oriented perpendicularly to the translation axis 1 is represented by the double arrows X and Y in the Figure. The blade springs 7a, 7b and 9a, 9b each have two peripheral portions 7a1, 7b1 and 9a1, 9a2, respectively, which each extend parallel to the plane XY oriented perpendicularly to the translation axis. Near their respective peripheral portions 7a1 and 9a1 the blade springs 7a and 9a are connected to the second body 5 and near their respective peripheral portions 7b1 and 9b1 the blade springs 7b and 9b are connected to the first body 3. The blade springs 7a and 7b are interconnected near their peripheral portions 7a2 and 7b2; the blade springs 9a1 and 9a2 are interconnected near their peripheral portions 9a2 and 9b2. As is apparent from FIGS. 1 and 2, the set of four blade spring elements 9 is arranged in mirror-inverted relationship with respect to the set of four blade spring elements 7. This mirror-inverted arrangement is merely given by way of example. Alternatively, other arrangements are possible, for example an arrangement in which both sets or oriented similarly or an arrangement which comprises only one of the sets.

Preferably, the blade springs 7a and 7b of the blade spring elements 7 are interconnected at their adjacent peripheral portions 7a2 and 7b2 in a rigid and noneformable deformable manner, as a result of which the blade springs 7a and 7b form an constant or substantially constant angle with one another near their interconnection. Furthermore, the lade springs 7a and 7b are preferably secured in or to the body 5 and 3, respectively, near their respective other peripheral portions 7a and 7b1 What has been stated here likewise relates to the set of four blade spring elements 9.

By way of example FIG. 3 shows one of the blade spring elements as used in the embodiment shown in FIGS. 2 and 3 in three practical positions. One of the blade spring elements 7 is taken as an example. In the present example, the blade springs 7a and 7b of the blade spring element 7 shown form a constant connection angle of 90° and are embedded in a portion 5a and 3a of the body 5 and 3, respectively, at their peripheral portions 7a1 and 7b1. In position I the first body 3 is in a neutral center position, in which the blade springs 7a and 7b are essentially non-deformed. In position II the body 3 has been moved over a distance A with respect to position I in the translation direction z1 indicated in FIG. 3. During the movement the angle has not changed but the two blade springs 7a and 7b have been subjected to a flexure which results in the shape of the blade spring element 7 in position II as shown in FIG. 3. From position II the body 3 is also movable over a distance A to position III, the body 3 being moved in the indicated direction z2. During this movement the angle also remains unchanged but the two blade springs 7a and 7b bend in another direction, which results in the shape of the blade spring element 7 corresponding to said position III. As is apparent from FIG. 3, no kinks are formed in the shapes of the blade springs 7a and 7b. The blade springs 7a and 7b are deformed gradually both from the portions 3a and 5a and from the connection angle . This is an important aspect in preventing material fatigue of the material of the blade spring element 7. In the present example, said movement over a distance A corresponds substantially to the maximum axial excursion of the first body 3 with respect to the second body 5. As regards the blade spring element 7 shown here, it is to be noted that the blade springs 7a and 7b can form an integral unit and can thus be constructed as one bent blade spring but, alternatively, the blade spring element 7 can be formed by separate blade springs 7a and 7b.

The embodiment of the device in accordance with the invention as shown in FIG. 4 comprises a first body 103 and a second body 105 and has a suspension means via which one of the bodies is movable with respect to the other body along a translation axis 101. The suspension means comprises a set of at least three blade spring elements 107, which blade spring elements are arranged in a regular fashion around the translation axis 101. The blade spring elements 107 are each constructed as one bent blade spring, each blade spring element having a first blade spring 107a and a second blade spring 107b. Near their adjacent peripheral portions the blade springs 107a and 107b have been provided with a injection-molded reinforcing element 108 in order to obtain a fixed, invariable connection angle between the two blade springs. Moreover, near their other peripheral portion the blade springs 107a and 107b are each embedded in a portion 105a of the body 105 and a portion 103a of the body 103, respectively, in order to form rigid connections to the body 105 and the body 103, respectively.

FIG. 5 shows a strip of a blade spring material from which a blade spring element similar to the blade spring elements 107 can be formed. In three zones the strip has a series of perforations 112a, 112b and 112c. The shape of the blade spring element is defined by bending the strip about bending axes 112a1, 112b1 and 112c1 which extend through the perforations. During molding the blade spring element thus formed are filled with injection-molding material, as a result of which a firm bond between the blade spring element and the element or portion molded around it is guaranteed.

FIGS. 6A and 6B show a blade spring element 207 formed as an integral injection-molded or die-cast product. The injection-molding material or die-casting material can be a suitable plastic or a suitable metal, respectively. The blade spring element 207 comprises two blade springs 207a and 207b, two free peripheral portions 207a1 and 207b1, as well as two adjoining peripheral portions 207a2 and 207b2. The dimensioning is such that the blade springs, which are comparatively thin, are flexible and the peripheral portions, which are comparatively thick, guarantee a constant angle ocbetween the two blade springs 207a and 207b, a constant angle β1 between the blade springs 207a and the peripheral portion 207a1, as well as a constant angle β2 between the blade springs 207b and the peripheral portion 207b1.

The loudspeaker in accordance with the invention shown in FIG. 7 comprises a chassis 302 and a diaphragm arrangement 304 which is movable with respect to the chassis 302 along a translation axis 301. The loudspeaker further comprises an electromagnetic driving system having a stationary part connected to the chassis 302 and a movable part connected to the diaphragm arrangement 304. The stationary part carries a magnet 306a and ferromagnetic elements 306b. The movable part carries a driving coil 308a arranged on a coil former 308b which forms part of a diaphragm arrangement. The diaphragm arrangement 304 further comprises a diaphragm 304a connected to the coil former 308b, which diaphragm is conical in the present example. In the present example the diaphragm 304a is connected to the frame 302 by means of a compliant mounting rim 310 near its front side. The diaphragm arrangement 304 is suspended with respect to the chassis 302 at the location of the coil former 308b. For this purpose an embodiment of the device in accordance with the invention is used as the suspension means. In this application the device in accordance with the invention comprises for this purpose one set of four blade spring elements 307 positioned around the translation axis 301. The blade spring elements 307 in this example are of a type corresponding to the blade spring elements 107 in the device in accordance with the invention shown in FIG. 4. At one side the blade spring elements 307 are connected to a stationary body formed by the chassis 302 and the parts 302a which are fixedly connected thereto and, at the other side, they are connected to a translatable body formed by the diaphragm arrangement 304 and elements forming parts thereof, such as the coil former 308b with the driving coil 308a. It is to be noted that instead of the suspension rim 310 it is alternatively possible to use a suspension means as described above.

The embodiment of the actuator in accordance with the invention shown in FIG. 8 comprises a stationary part 402, a part 404 which is translatable with respect to the stationary part 402 along a driving or translation axis 401, and an electromagnetic driving system 406. The stationary part 402 comprises a first body having portions 405a, 405b and 405c and the translatable part 404 comprises a second body having portions 405a, 405b and 405c. The driving system 406 comprises a driving coil 406a secured to the first body, a permanent magnet 407b6 secured to the second body, and a magnetic yoke 406c secured to the second body. The present example also utilizes a compensation magnet 406b1. Between the two bodies a suspension means is arranged, which in the present example comprises two sets of four blade spring elements 407 and 409 each. The blade spring elements 407 and 409 each comprise two blade springs 407a, 407b and 409a, 409b, respectively, which are inclined with respect a plane oriented perpendicularly to the translation axis 401 and which are constructed in a manner as described hereinbefore and are connected to said first and said second body. The part of the actuator referred to as the stationary part 402 and the part of the actuator referred to as the translatable part 404 perform accurately defined movements with respect to one another along the translation axis 401 upon energization of the driving coil 406a. In the present example the part 402 is secured to a panel 410 which serves as a radiator in a loudspeaker system. In another application the part 402 can be secured to, for example, a machine, such as a combustion engine, or a machine part, particularly if the actuator in accordance with the invention is intended as a vibration canceler. Moreover, the actuator in accordance with the invention can be used for moving an element such as a valve, in which case the stationary part will generally be secured to a stationary chassis.

It is to be noted that the invention is not limited to the embodiments disclosed herein by way of examples. For example, the blade springs can be made of suitable materials other than those mentioned herein.

What is claimed is:

1. A device comprising two bodies which are disposed coaxially with respect to a translation axis, and comprising a suspension means via which at least one of the bodies is movable with respect to the other body along the translation axis, characterized in that the suspension means comprises a set of at least three blade spring elements positioned around the translation axis, said blade spring elements each comprising two blade springs inclined with respect to a plane oriented perpendicularly to the translation axis, the blade springs of each blade spring element each having two peripheral portions each extending parallel to a plane oriented perpendicularly to the translation axis, one of the blade springs being connected to the one body near one of its peripheral portions, and the other blade spring being connected to the other body near one of its peripheral portions, the blade springs of each blade spring element being interconnected near their other peripheral portions at an angle therebetween.

2. A device as claimed in claim 1, characterized in that each blade spring element has the one blade spring non-deformably secured in the one body by one of its peripheral portions, and has the other blade spring non-deformably secured in or to the other body by one of its peripheral portions.

3. A device as claimed in claim 2, characterized in that each blade spring element has one of the peripheral portions of each blade spring embedded in a part of one of the bodies so as to form a rigid connection.

4. A device as claimed in claim 1, characterized in that each of the peripheral portions has a perforation.

5. A device as claimed in claim 1, characterized in that the blade springs of each blade spring element together form part of one bent blade spring.

6. A device as claimed in claim 1, characterized in that each blade spring element is an integral injection-molded or die-cast product.

7. A device as claimed in claim 1, characterized in that the suspension means comprises a further set of at least three blade spring elements positioned around the translation axis, the two sets being axially spaced from one another.

8. A loudspeaker device comprising a chassis and a diaphragm arrangement which is movable with respect to the chassis, said loudspeaker device further comprising a device as claimed in claim 1, the chassis comprising the one body and the diaphragm arrangement comprising the other body.

9. An actuator having a stationary part, a translatable part which is translatable with respect to the stationary part, and an electromagnetic driving system, said actuator further including a device as claimed in claim 1, the stationary part comprising the one body and the translatable part comprising the other body.

10. A suspension means constructed and intended for use in a device as defined in claim 1.

11. A device comprising:

two bodies disposed coaxially with respect to a translation axis; and a suspension means via which at least one of the bodies is movable with respect to the other body along the translation axis, the suspension means comprising a set of at least three blade spring elements positioned around the translation axis, said blade spring elements each comprising two blade springs inclined with respect to a plane oriented perpendicularly to the translation axis, the blade springs of each blade spring element each having two peripheral portions each extending parallel to a plane oriented perpendicularly to the translation axis, one of the blade springs being connected to the one body near one of its peripheral portions, and the other blade spring being connected to the other body near one of its peripheral portions, and the blade springs of each blade spring element being interconnected near their other peripheral portions, such that at the adjacent peripheral portions of the blade springs, the blade springs of each blade spring element are interconnected in a non-deformable fashion.

12. A device as claimed in claim 11, characterized in that near two adjacent peripheral portions, the blade springs of each blade spring element are embedded in a material so as to form a rigid connection.

13. A device as claimed in claim 11, characterized in that each blade spring element has the one blade spring non-deformably secured in the one body by one of its peripheral portions, and has the other blade spring non-deformably secured in or to the other body by one of its peripheral portions.

14. A device as claimed in claim 11, characterized in that each of the peripheral portions has a perforation.

15. A device as claimed in claim 11, characterized in that the blade springs of each blade spring element together form part of one bent blade spring.

16. A device as claimed in claim 11, characterized in that each blade spring element is an integral injection-molded or die-cast product.

17. A device as claimed in claim 11, characterized in that the suspension means comprises a further set of at least three blade spring elements positioned around the translation axis, the two sets being axially spaced from one another.

18. A loudspeaker device comprising a chassis and a diaphragm arrangement which is movable with respect to the chassis, said loudspeaker device further comprises a device as claimed in claim 2, the chassis comprising the one body and the diaphragm arrangement comprising the other body.

19. An actuator having a stationary part, a translatable part which is translatable with respect to the stationary part, and an electromagnetic driving system, said actuator further including a device as claimed in claim 11, the stationary part comprising the one body and the translatable part comprising the other body.

20. A suspension means constructed and obviously intended for use in a device as defined in claim 11.

* * * * *